US008018972B2

(12) United States Patent
Roberts et al.

(10) Patent No.: US 8,018,972 B2
(45) Date of Patent: Sep. 13, 2011

(54) TIMING OVER PACKET PERFORMANCE

(75) Inventors: Peter Roberts, Stittsville (CA); Kin-Yee Wong, Ottawa (CA)

(73) Assignee: Alcatel Lucent, Paris (FR)

( * ) Notice: Subject to any disclaimer, the term of this patent is extended or adjusted under 35 U.S.C. 154(b) by 155 days.

(21) Appl. No.: 12/495,391

(22) Filed: Jun. 30, 2009

(65) Prior Publication Data

US 2010/0329125 A1 Dec. 30, 2010

(51) Int. Cl.
*H04J 3/06* (2006.01)

(52) U.S. Cl. ......... 370/507; 370/509; 370/517; 709/248

(58) Field of Classification Search ........................ None
See application file for complete search history.

(56) References Cited

U.S. PATENT DOCUMENTS

2007/0223537 A1 * 9/2007 Crowle et al. ................ 370/503
2010/0085989 A1 * 4/2010 Belhadj et al. ................ 370/503

OTHER PUBLICATIONS

Jeong-Dong Ryoo; Jongtae Song; Jaewoo Park; Bheom-Soon Joo; , “OAM and its performance monitoring mechanisms for carrier ethernet transport networks,” Communications Magazine, IEEE , vol. 46, No. 3, pp. 97-103, Mar. 2008.*
Technical Committee on Sensor Technology (TC-9), “IEEE Standard for Precision Clock Synchronization Protocol for Networked Measurement and Control Systems”, IEEE, NYNY, Jul. 2008.

* cited by examiner

*Primary Examiner* — Kwang B Yao
*Assistant Examiner* — Jeffrey M Rutkowski
(74) *Attorney, Agent, or Firm* — Kramer & Amado P.C.

(57) ABSTRACT

The invention is directed to a method and apparatus for providing improved packet over timing clock synchronization in a packet switching network using Operations, Administration, and Maintenance (OAM) tools to compensate for asymmetrical characteristics between forward and reverse data paths.

20 Claims, 4 Drawing Sheets

Start
300
Receive path asymmetry characteristics 302
Calculate asymmetry factor 304
Receive Sync Packet 306
Transmit Delay Request Packet 308
Receive Delay Response Packet 310
Calculate slave clock offset 312
Synchronize Slave Clock 314
End

TIMING OVER PACKET PERFORMANCE

FIELD OF THE INVENTION

The invention is directed to packet switching communication networks, using timing-over-packet synchronization, particularly to improvements to timing-over-packet performance using Operations, Administration, and Maintenance (OAM) tools.

BACKGROUND OF THE INVENTION

Time-of-Day functionality is needed to support some LTE applications, which is an important area for future telecommunications technologies. Current timing over packet techniques include: Institute of Electrical and Electronic Engineers standard 1588 (IEEE1588); Internet Engineering Task Force (IETF) Network Timing Protocol (NTP) (rfc4330); or International Telecommunications Union (ITU) standard J.211. These techniques typically use timestamps or other mechanisms built into each standard. These techniques typically assume symmetrical transfer delay from master to slave and from slave to master, however in many circumstances, such as for example, when the forward path is diverse from the reverse path, this assumption is not valid.

Therefore, a means of providing improved timing over packet that does not depend on symmetrical transfer delay is highly desirable.

SUMMARY OF THE INVENTION

The invention is directed to providing improved clock synchronization in packet-over-timing clock synchronization in a packet switching network by compensating for asymmetrical characteristics between forward and reverse data paths.

One aspect of the present invention provides a method of providing clock synchronization in a packet switching network between a first network element having a first clock and a second network element having a second clock. The method has steps of: receiving at the second network element, asymmetry characteristics between a forward path and a reverse path, the forward path from the first network element to the second network element, and the reverse path from the second network element and the first network element; calculating at the second network element an asymmetry factor; receiving at the second network element at a first receive time, a synchronization packet containing a first transmit time from the first network element; transmitting from the second network element, to the first network element at a second transmit time, a delay request packet; receiving at the second network element, a delay response packet containing a second receive time, from the first network element; calculating at the second network element a clock offset using the asymmetry factor, the first and second transmit times and the first and second the receive times; and synchronizing at the second network element, the second clock with the first clock using the clock offset.

In some embodiments of the invention the step of receiving the asymmetry characteristics comprises receiving one or more of the following data: network topology information; link speed and link distance parameters; and link loading information.

In some embodiments of the invention the network topology information comprises: the number of first network elements on the forward path and the number of second network elements on the reverse path; and the type of each of the first and second network elements.

In some embodiments of the invention wherein the network topology information is derived from one or more of the following: a trace-route OAM tool; a network-aware network management system; and a manually pre-populated table.

In some embodiments of the invention the step of receiving the asymmetry characteristics comprises receiving end-to-end throughput statistics.

In some embodiments of the invention the steps of receiving a synchronization packet, transmitting a delay request packet and receiving delay response packet, follow a standard precision time protocol.

In some embodiments of the invention the precision time protocol follows the Institute of Electrical and Electronic Engineers standard 1588.

Another aspect of the present invention provides a slave network element for providing clock synchronization from a first network element in a packet switching network. The slave network element comprises: a first interface for receiving synchronization packets from a the first network element; a second interface for transmitting delay request packets to the first network element; an asymmetry estimator configured to receive asymmetry characteristics, between a forward path and a reverse path, the forward path being from the first network element to the slave network element, and the reverse path from the slave network element and the first network element; wherein the asymmetry estimator is further configured to calculate an asymmetry factor from the asymmetry characteristics.

In some embodiments of the invention the slave clock is configured to: receive at the first interface, at a first receive time, a synchronization packet containing a first transmit time from the first network element; to transmit from the second interface, to the first network element at a second transmit time, a delay request packet; to receive at the first interface, a delay response packet containing a second receive time, from the first network element; and to calculate a clock offset using the asymmetry factor, the first and second transmit times and the first and second the receive times.

In some embodiments of the invention the slave clock is configured to synchronize to a first clock on the first network element, using the clock offset.

In some embodiments of the invention the slave network element is further configured: to receive at the first interface at a first receive time, a synchronization packet containing a first transmit time from the second network element; to transmit from the second interface, to the second network element at a second transmit time, a delay request packet; to receive at the second interface, a delay response packet containing a second receive time, from the second network element; to calculate at the second network element, a clock offset using the asymmetry factor; and to synchronize at the second network element, the second clock with the first clock using the clock offset, the first and second transmit times and the first and second the receive times.

In some embodiments of the invention the asymmetry characteristics are selected from the group of: network topology information; link speed and link distance parameters; and link loading information.

In some embodiments of the invention the asymmetry characteristics comprise end-to-end throughput statistics.

In some embodiments of the invention the network topology information comprises: the number of network elements on the forward path and the number of network elements on the reverse path; and the type of each of the first and second network elements.

In some embodiments of the invention the asymmetry estimator is configured to receive the network topology information from one or more of the following: a trace-route OAM tool; a network-aware network management system; and a manually pre-populated table.

In some embodiments of the invention the slave clock is configured to receive synchronization packet, transmit the delay request packet and receive the delay response packet according to the Institute of Electrical and Electronic Engineers precision time protocol 1588 standard.

Another aspect of the present invention provides program storage device readable by a machine, tangibly embodying a program of instructions executable by the machine to perform method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Synchronization of network elements in a packet switching telecommunications network involves conveying synchronization clock information from a first network element (master) to a second network element (slave). Current timing over packet techniques include: IEEE1588; NTP; and ITU J.211. These techniques typically transmit a synchronization packet with a time stamp from a master network element to a slave network element, and transmit another packet in the reverse direction. By comparing timestamps, a total packet transfer delay can be calculated. Current techniques then assume a symmetrical packet delay for forward and reverse direction and using this assumption to arrive at a mean transfer delay of one half of the total delay.

Figure 1:
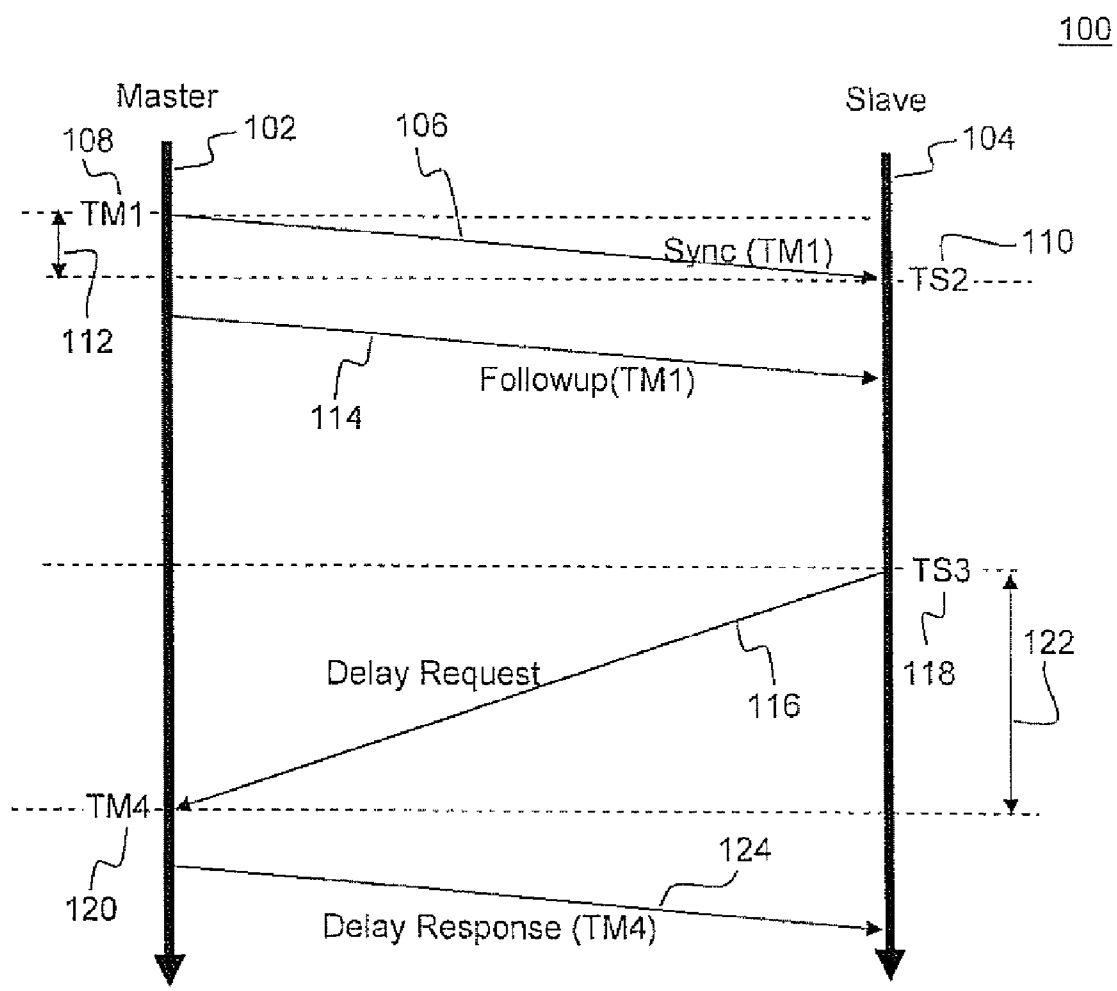
FIG. 1 illustrates a message flow diagram of an aspect of an embodiment of the packet over timing technique of the present invention.

Aspects of the IEEE 1588 Precision Time Protocol are described in more detail, with respect to the message flow diagram 100 of FIG. 1, where messages to and from a network element having a master clock are indicated with reference to timeline 102, and messages to and from a network element having a clock slaved to the master are indicated with reference to timeline 104. The synchronization process is accomplished in two phases: in the first phase an offset time difference between master and slave is corrected; in the second phase a delay measurement estimates the delay between master and slave. Thus in the first phase, at regular intervals (by default every 2 seconds), for example at time TM1 (108) the master transmits a Sync(TM1) message 106 containing a time stamp for TM1 (108), which is received by the slave at time TS2 (110). The slave clock then calculates a first estimate of the Offset correction $$\text{Offset}=(TS2-TM1)+\text{Delay} \tag{1}$$

In the second phase (by default at random intervals between 4 and 60 seconds), the slave sends a Delay Request packet 116 at time TS3 (118) to the master. The master generates a time stamp TM4 (120) on receipt of the Delay Request packet 116 and sends a Delay Response packet 124, containing the time stamp TM4 (120) back to the slave. The slave then determines an estimate for the total round-trip transfer delay $$\text{Delay}MS+\text{Delay}SM=(TS2-TM1)+(TM4-TS3) \tag{2}$$

where DelayMS is the transfer delay from master to slave and DelaySM is the transfer delay from slave to master. Using this technique, the total round-trip transfer delay from master to slave and from slave to master can be calculated but each of the forward and reverse transfer delays can not be separated. Typically, the transfer delays are assumed to be symmetrical thus the one-way transfer delay is assumed to be one half of the total round-trip transfer delay $$est.\text{ Delay}=\frac{((TS2-TM1)+(TM4-TS3)}{2} \tag{3}$$

In many telecommunications networks, the forward path and the reverse path have different characteristics that contribute to asymmetry between the forward and reverse transfer delays. Embodiments of the present invention use information about these characteristics to estimate the asymmetry and thereby provide a mechanism for determining the forward and reverse transfer delays individually and thus improve the synchronization accuracy of timing-over-packet networks. The measure of asymmetry, (asymmetry factor) "δ" (delta) can be defined by $$\text{DelayMS}=\delta*\text{DelaySM} \tag{4}$$

Thus δ would be 1 in the case where the forward delay and reverse delay are the same. The forward and reverse transfer delays can be represented by $$\text{Delay}MS+\text{Offset}=TS2-TM1 \tag{5}$$

$$\text{Delay}SM-\text{Offset}=TM4-TS3 \tag{6}$$

Equations 4 and 5 can be combined to yield $$\delta*\text{Delay}SM+\text{Offset}=TS2-TM1 \tag{7}$$

and thus the Offset can be determined by $$\text{Offset}=\frac{[(TS2-TM1)-\delta*(TM4-TS3)]}{(1+\delta)} \tag{8}$$

In the example of FIG. 1, the master to slave transfer delay 112 is different from the slave to master transit delay 122. This can happen if, for example, the reverse path for messages from the slave to master has different characteristics compared to the forward path for messages from the master to slave.

Figure 4:
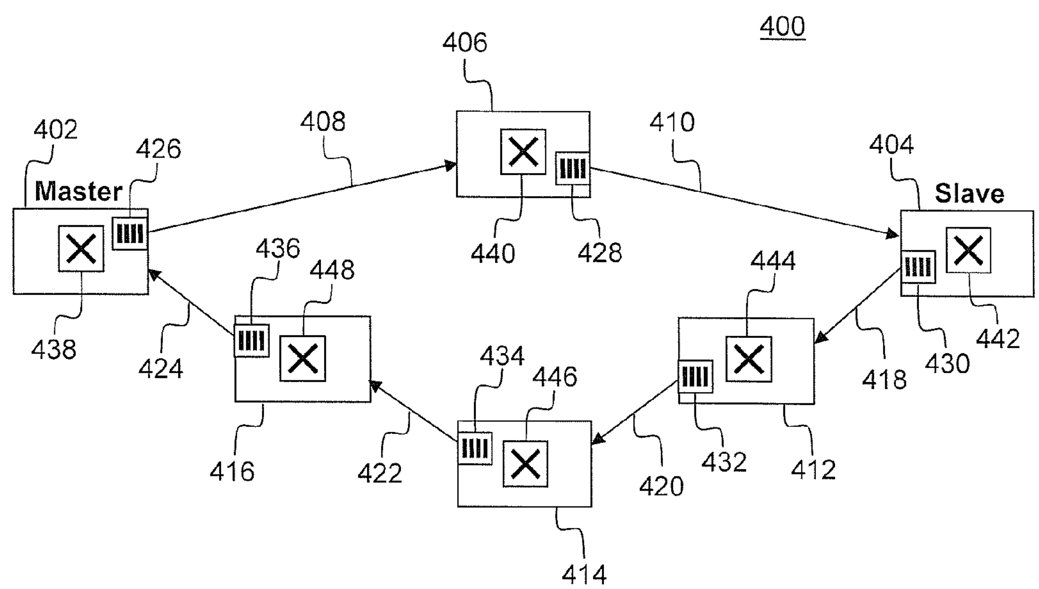
FIG. 4 illustrates a block diagram of a communications network in which forward path and reverse path between a master and slave nodes are diverse.

Different characteristics can include, topology, such as different number of intermediate nodes in the forward path and the return path as illustrated in FIG. 4 where the forward path from master node 402 goes through intermediate node 406 to slave node 404, and the return path from slave node 404 to master node 402 goes through intermediate nodes 412, 414 and 416.

Embodiments of the present invention use network topology information to improve estimates of asymmetry using one or more of the following: manually pre-populating the number of nodes ($N_f$) in the forward path and number of nodes ($N_b$) in the reverse path; retrieving the number of nodes in the forward path and in the reverse path from a network-aware network management system; or using a path trace tool as found in any of the following standards: Internet Engineering Task Force (IETF) RFC-5586; IETF-RFC-1393; International Telecommunications Union (ITU-T) Y.1731; and IEEE 802.1ag. Because each node and corresponding link in a data path typically introduces a finite delay, the knowledge that there are a different number of nodes in the forward path compared to the reverse path can be very useful. If the only metric available is the hop count or number of nodes, in one embodiment, the measure of asymmetry "δ" can be estimated as $$\delta = \frac{N_f - 1}{N_b - 1} \tag{9}$$

Where $N_f$ is the number of nodes inclusive in the forward direction and $N_b$ is the number of nodes inclusive in the reverse direction.

The estimated value for "δ" can be used in equation 8 to calculate a more accurate value for clock offset and thereby improve the clock synchronization performance.

Other characteristics include link speed and link distance. Referring to FIG. 4, each link 408, 410, 418, 420, 422 and 424 could have different link interface speeds and could have different physical lengths which would both affect transfer delay of packets traversing those links. In this case the link speed and link distance parameters can be used to calculate the actual transmission times required for the timing packet to transit each link. This is the time for the packet to be transmitted by one end of the link, propagate down the transmission link at the link speed, and then be fully received by the other end of the link. This can then be summed for all the links in the path. The average residence time "A" per node is also considered. Thus in another embodiment, the measure of asymmetry "δ" can be estimated as $$\delta = \frac{A*(N_f - 1) + \sum_{i=1}^{N_f-1} TD(S_{fi}, D_{fi})}{A*(N_b - 1) + \sum_{i=1}^{N_b-1} TD(S_{bi}, D_{bi})} \tag{10}$$

where A is the average residence time per node, and TD(S,D) is the transmission delay for a link of speed S and distance D. This estimated value for "δ" from equation 10 can be used in equation 8 to calculate a more accurate value for clock offset.

Figure 5:
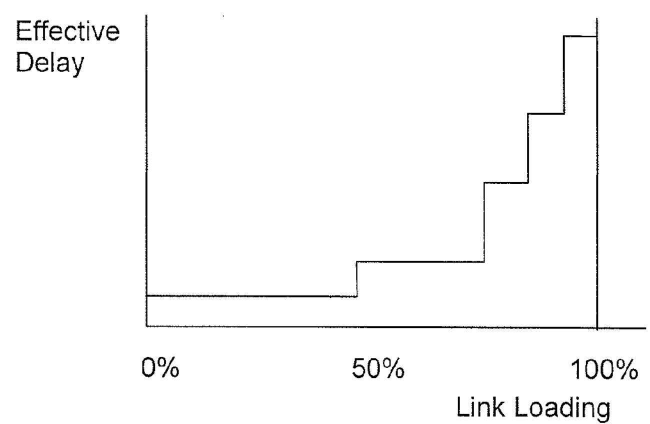
FIG. 5 illustrates a graph of link transfer delay as a result of link loading in a communications network.

Another characteristic that can affect transfer delay is link loading. In this case, link loading of each link defines an expected delay due to competing traffic on the link, which can load egress buffers 426, 428, 430, 432, 434, 436 shown in FIG. 4. In real networks, this loading level can affect the minimum delay experienced by packets as represented in the graph of FIG. 5. In one embodiment of the present invention, a lookup table is created, that defines an expected delay weight for a range of load percentages. This data can be determined by lab measurements or live traffic measurements, as would be well understood by persons having skill in the art. Using this lookup table, the measure of asymmetry "δ" can be estimated using equation 11

$$\delta = \frac{\sum_{i=1}^{N_f-1} LD(L_{fi})}{\sum_{i=1}^{N_b-1} LD(L_{bi})} \tag{11}$$

where LD (L) is the transmission delay weight for a link with a load percentage of L. This estimated value for "δ" from equation 11 can also be used in equation 8 to calculate an improved value for clock offset.

Another characteristic that can affect transfer delay is the type of network node. Different types of nodes such as switches or routers, different models of the same type of device and different manufacturers can introduce different intra-node switching delays as a result of different switching fabrics, processor speed and architecture which in turn can affect the performance of the node and the resulting transfer delay. For example, routers often introduce more delay that switches because of the additional packet analysis and processing required. With reference to FIG. 4, switching fabrics 438, 440, 442, 444, 446, and 448 could be different and thus affect transfer delay. In one embodiment of the present invention, a lookup table is created, that maps an expected intra-node switching delay to a network node type (model, type and/or manufacturer). The expected intra-node switching delay can be determined by lab measurements, real-world measurements or by other means as would be well understood by persons skilled in the art. The node type information can be collected through a network-aware network management system, or manually pre-populated. Using this lookup table, the measure of asymmetry "δ" can be estimated as $$\delta = \frac{\sum_{i=1}^{N_f-1} SD(NT_{fi})}{\sum_{i=1}^{N_b-1} SD(NT_{bi})} \tag{12}$$

where SD(NT) is the expected intra-node switching delay for node type NT. This estimated value for "δ" from equation 12 can be used in equation 8 to calculate a more accurate value for clock offset.

Combinations of the above calculations can be used such as for example, combining the information of equation 5 or 6 with that of equation 8. Additional information affecting transfer delay can also be used to more accurately model the actual delays, and thereby improve the synchronization performance of the timing-over-packet network.

OAM tools such as ITU-T Y.1731 can provide end-to-end packet throughput measurements for packet networks. This information could be used instead of link speed, link distance and link loading parameters to provide an estimate of asymmetry "δ"

$$\delta = \frac{T_f}{T_b} \tag{13}$$

where $T_f$ represents end-to-end throughput in the forward direction and $T_b$ represents end-to-end throughput in the forward direction. This estimated value for "δ" from equation 13 could be used instead of the values from equations 9, 10, 11 or 12 as input to equation 8 to calculate a more accurate value for clock offset.

Figure 2:
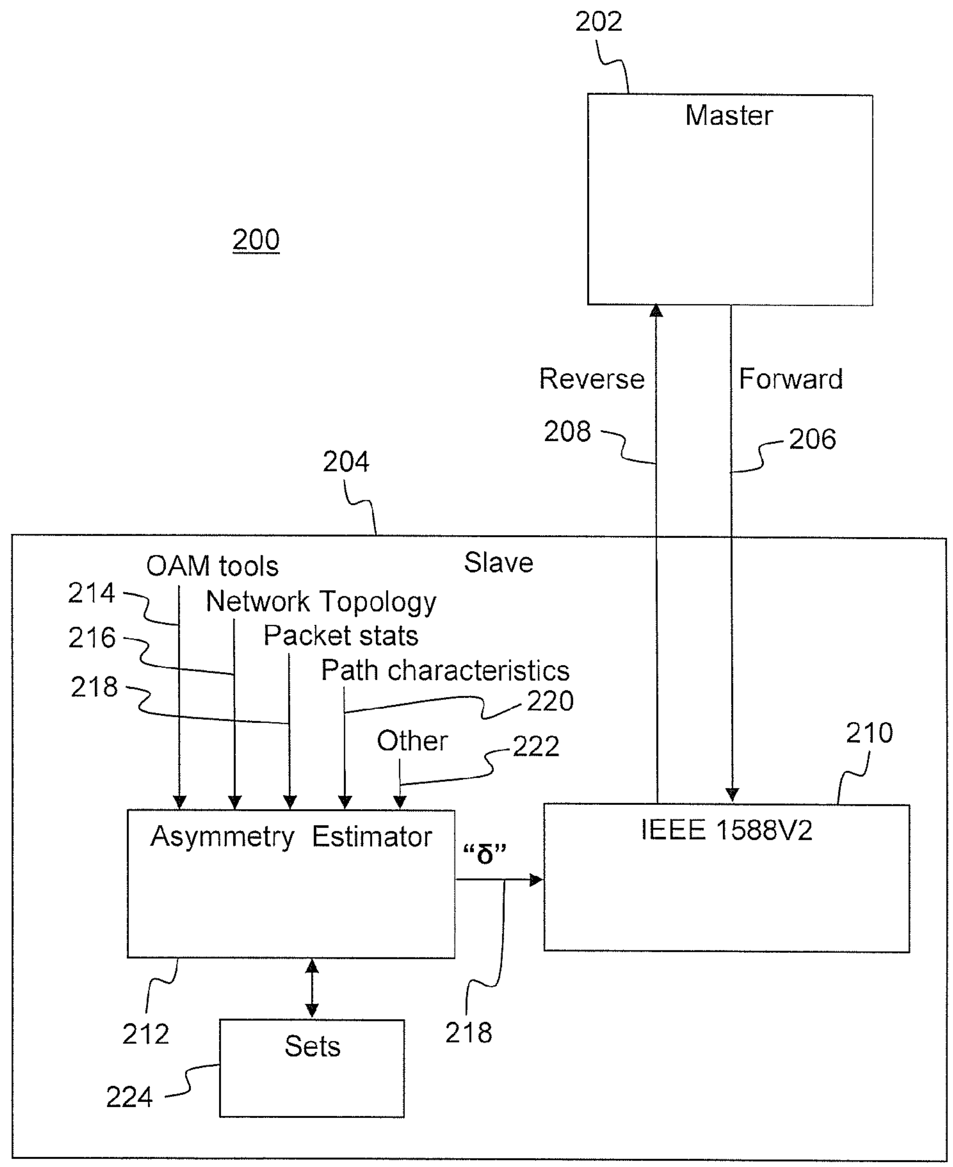
FIG. 2 illustrates a block diagram of an embodiment of improved packet over timing system of the present invention.

FIG. 2 illustrates a block diagram of an embodiment of a system 200 to provide improved packet over timing. Network node 202 (network element or master node) provides a master clock for synchronizing a slave clock of node 204 (network node, network element or slave node). Link 206 provides a forward datapath and link 208 provides a return path or reverse data-path for data traffic and synchronization packets. Slave clock 210 implements a precision time protocol such as IEEE 1588V2 to recover clock synchronization from master node 202 using synchronization packets, modified to accept an asymmetry factor "δ" (218) from Asymmetry estimator 212, in order to provide a better synchronization performance especially for networks where some or all nodes have diverse forward path and reverse paths to other nodes. Asymmetry estimator 212 receives one or more inputs from OAM tools (214), Network topology information (216), packet statistics (218) such as end-to-end data throughput, path characteristics (220), or other information or data (222) which would characterize an asymmetry in forward path and reverse path transfer delays between nodes in communications network 200. The asymmetry estimator 212 processes the received data as described above, and provides an asymmetry estimate "δ" (218) to slave clock 210. Equations for synchronization calculations can be stored as data sets in store 224, which can be implemented as random access memory, flash memory, or other storage means as would be well understood by persons skilled in the art.

Figure 3:
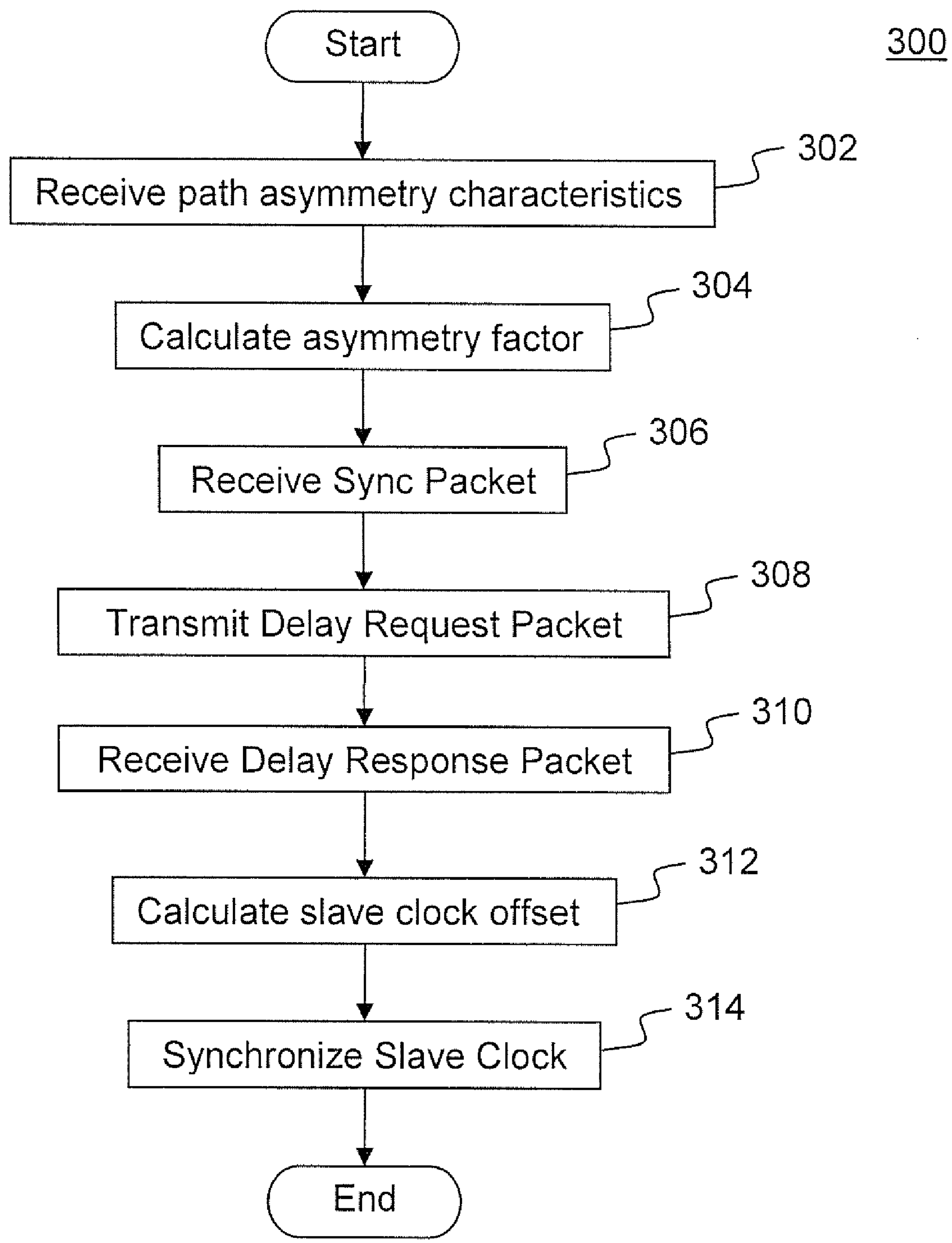
FIG. 3 illustrates a flow chart of a method of providing improved packet over timing according to an embodiment of the present invention.

In operation, with reference to FIG. 3, at step 302 the asymmetry estimator 212 of slave node 204 receives path asymmetry characteristics. These can include: network topology information, from a trace-route OAM tool, from a network-aware network management system or via a manually pre-populated table, identifying diverse forward and reverse data-paths between the master and slave node; link speed and link distance parameters, which can be determined from network management OAM tools or via manually pre-populated table; link loading for applicable links in the data-paths (or paths) of interest, which can be determined in advance from lab measurements or live traffic measurements; node types in the data-paths between the master and slave nodes, which can be determined through a network-aware network management system, or manually pre-populated; or end-to-end throughput statistics which can be determined using OAM tools such as ITU-T Y.1731.

At step 304 the asymmetry estimator 212 of the slave node 204 calculates an asymmetry factor "δ". At step 306, the slave clock 210 of the slave node 204 receives a Sync packet from master node 202. At step 308, the slave clock 210 transmits a Delay Request packet to master node 202. At step 310, the slave clock 210 receives a Delay Response packet from master node 202. At step 312, the slave clock 210 calculates the slave clock offset using the asymmetry factor 218 and the timestamp information retrieved at steps 306, 308, and 310. At step 314, the slave clock synchronizes the slave clock time using the offset calculated at step 312.

The above techniques, separately or in combination can be used to provide improved estimate of transfer delay asymmetry and thereby improve clock synchronization performance in packet switching networks.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of providing clock synchronization in a packet switching network between a first network element having a first clock and a second network element having a second clock, the method comprising:

receiving, at the second network element, asymmetry characteristics between a forward path and a reverse path, the forward path from the first network element to the second network element, and the reverse path from the second network element to the first network element, wherein the asymmetric characteristics comprise average residence time per node in the forward path and the reverse path;

calculating, at the second network element, an asymmetry factor;

receiving, at the second network element at a first receive time, a synchronization packet containing a first transmit time from the first network element;

transmitting, from the second network element to the first network element at a second transmit time, a delay request packet;

receiving, at the second network element, a delay response packet containing a second receive time, from the first network element;

calculating, at the second network element, a clock offset using the asymmetry factor, the first and second transmit times, and the first and second receive times; and synchronizing, at the second network element, the second clock with the first clock using the clock offset.

2. The method of claim 1, wherein the asymmetry characteristics further comprise link speed and link distance parameters.

3. The method of claim 2, wherein the network topology information further comprises:

a number of first network elements on the forward path and a number of second network elements on the reverse path; and a type of each of the first and the second network elements.

4. The method of claim 2, wherein the network topology information is derived from a manually pre-populated table.

5. The method of claim 1, wherein the step of receiving the asymmetry characteristics further comprises:

receiving end-to-end throughput statistics.

6. The method of claim 1, wherein the asymmetry characteristics further comprise link loading information.

7. The method of claim 6, wherein the asymmetry characteristics further comprise a transmission delay weight for a link with a particular load percentage.

8. The method of claim 1, wherein the asymmetry characteristics further comprise an expected intra-node switching delay for a particular node type.

9. An apparatus for providing clock synchronization from a first network element having a first clock in a packet switching network, the apparatus comprising:

a first interface for receiving synchronization packets from the first network element;

a second interface for transmitting delay request packets to the first network element;

an asymmetry estimator configured to receive asymmetry characteristics, between a forward path and a reverse path, the forward path being from the first network element to a second network element, and the reverse path from the second network element to the first network element, wherein the asymmetry estimator is further configured to calculate an asymmetry factor from the asymmetry characteristics and the asymmetric characteristics comprise average residence time per node in the forward path and the reverse path.

10. The apparatus of claim 9, further comprising:

a second clock, wherein the second clock is configured to receive, at the first interface at a first receive time, a synchronization packet containing a first transmit time from the first network element, transmit, from the second interface to the first network element at a second transmit time, a delay request packet, receive, at the first interface, a delay response packet containing a second receive time, from the first network element; and calculate a clock offset using the asymmetry factor, the first and second transmit times, and the first and second receive times.

11. The apparatus of claim 10, wherein the second clock is configured to synchronize to the first clock on the first network element using the clock offset.

12. The apparatus of claim 11, wherein the apparatus is further configured to receive, at the first interface at a first receive time, a synchronization packet containing a first transmit time from the second network element, transmit from the second interface, to the second network element at a second transmit time, a delay request packet, receive at the second interface, a delay response packet containing a second receive time, from the second network element, calculate at the second network element, a clock offset using the asymmetry factor, and synchronize at the second network element, the second clock with the first clock using the clock offset, the first and second transmit times, and the first and second receive times.

13. The apparatus of claim 9, wherein the asymmetry characteristics further comprise link speed and link distance parameters.

14. The apparatus of claim 13, wherein the network topology information comprises the number of network elements on the forward path and the number of network elements on the reverse path, and the type of each of the first and second network elements.

15. The apparatus of claim 14, wherein the asymmetry estimator is configured to receive the network topology information from a manually pre-populated table.

16. The apparatus of claim 9, wherein the asymmetry characteristics comprise end-to-end throughput statistics.

17. The apparatus of claim 9, wherein the asymmetry characteristics further comprise link loading information.

18. The apparatus of claim 17, wherein the asymmetry characteristics further comprise a transmission delay weight for a link with a particular load percentage.

19. The apparatus of claim 9, wherein the asymmetry characteristics further comprise an expected intra-node switching delay for a particular node type.

20. A non-transitory program storage device readable by a machine, tangibly embodying a program of instructions executable by the machine to perform the method of claim 1.

* * * * *